United States Patent [19]
Darby

[11] Patent Number: 5,216,832
[45] Date of Patent: Jun. 8, 1993

[54] ANIMAL CHASING DEVICE

[76] Inventor: Ronald A. Darby, Pali Palms Plz., 970 Kalaheo Ave., Ste. A311, Kailua, Hi. 96734

[21] Appl. No.: 764,525

[22] Filed: Sep. 24, 1991

Related U.S. Application Data

[63] Continuation-in-part of Ser. No. 618,974, Nov. 28, 1990, abandoned.

[51] Int. Cl.⁵ .............................................. A01M 29/00
[52] U.S. Cl. .............................................. 43/81; 43/1; 43/96
[58] Field of Search .......................... 43/1, 81, 81.5, 96

[56] References Cited

U.S. PATENT DOCUMENTS

| | | | |
|---|---|---|---|
| 4,574,519 | 3/1986 | Eckebrecht | 43/81 |
| 4,592,162 | 6/1986 | Hallback | 43/81 |
| 4,779,374 | 10/1988 | Feldman | 43/81 |
| 5,024,183 | 6/1991 | Baer | 43/81 X |

Primary Examiner—Richard K. Seidel
Assistant Examiner—Kenneth J. Hansen
Attorney, Agent, or Firm—James Creighton Wray

[57] ABSTRACT

An animal pest control device which is spring actuated has elements that move rapidly at the animal which has actuated it, but is so configured as to: (a) not cause physical harm to the animal if contact is made., and (b) have the animal experience different effects or degrees of effect depending upon both the magnitude and direction of the force applied by the animal in actuating the device; thereby causing sufficient unpleasant memories that the animal is trained not to return to the area where the device is located. The spring and air actuated device chases animals from buildings, furniture, boats and other vehicles. Two body-members held together by the tension force created by springs pressing them together until a force from an animal depresses the center area to an extent that a torque is created which causes the extreme ends of the body-members and the springs to move rapidly at the animal, thus scaring the animal. A multiplicity of animal chasing devices to be located in an area for discouraging the revisiting of the area by animals.

6 Claims, 2 Drawing Sheets

ANIMAL CHASING DEVICE

This is a continuation-in-part of application Ser. No. 618,974 filed Nov. 28, 1990, now abandoned.

BACKGROUND

A basic problem is caused by birds defecating on structures and vehicles of all types including buildings, walls, bridges, parked automobiles, as well as boats and ships. The excrement is unsightly and may cause health problems by attracting germs and insects. Also the excrement on walking surfaces may form a slippery surface causing persons to slip and fall.

Over the years many means to flush, chase, or scare birds have been used. However, birds are known to accommodate to loud noise (e.g. propane cannons), and models of their enemies (e.g. snakes, owls etc.) if they are not caused any harm or injury by the sound or devices. The following excerpts from reference 1 summarizes the situation: "The success of attempts to frighten birds away from any given area depends on our understanding of their reactions to repellent stimuli. In the interests of self-preservation, all birds react automatically to unfamiliar sights and sounds. Thus, almost any loud noise or unusual object will initially produce an effect—at least an increase in wariness or readiness to flee. However, if birds continually reacted this way to all miscellaneous noises and objects, they would be constantly alarmed. This, of course, would interfere with other necessary activities. Feeding. for example, might be disrupted to the point of starvation. To counteract this, then, birds slowly learn to ignore noises and objects as they become familiar and prove harmless . . . Recognizing that birds learn to ignore a scare device through repeated experience without any adverse effect, we must proceed in such a way that learning cannot take place. In principle, success can easily be accomplished by: (1) never using the same scare device often enough to permit learning; (2) making certain something unpleasant, such as shooting a member of the flock, occurs simultaneously with the scare device often enough to teach the birds that there is cause for real alarm . . . " However, in many situations, it is desirous to not harm or injure the birds, especially if endangered species are involved.

Currently available methods to control bird pest problems which do not involve injuring the animal are categorized as follows:
1. Visual Scare Methods involving devices e.g., scarecrows; replicas of owls, pigeon hawks, snakes and cats., flashing lights., and balloons with surrealistic eyes; all of which may exhibit movement due to the wind or even internally driven systems.
2. Sonic Scare Methods involving devices audible electronic alarms; and ultrasonic repellents involving devices e.g., stainless steel
3. Passive Physical Methods needle strips; nets; and metal spiral barriers.
4. Chemical Methods involving liquid or gel chemical repellants.
5. Electrical Shock involving exposed wires energized with high voltage, but low amperage. According to the excerpt above, the use of any one of the scare methods in the first two method categories will not train birds to permanently leave an area to be protected since the birds slowly learn to ignore the scare objects or noises as they become familiar and prove harmless. The items in the last three method categories can not be used in the area frequented by humans, such as boat decks, porch floors, railing, exterior corridors, etc.; since the needle strips, nets, wires, and metal barriers may be physically harmful to human and chemical repellants may cause toxic, slippery and/or unslightly surfaces.

Thus, there is a need for a method which sufficiently causes unpleasant experiences for birds and other wild animals without injuring them such that they do not return to the area where they experienced the effect of the method. There is also a need for a method to aid in the training of pets, e.g. dogs and cats; to avoid certain areas, such as furniture or selected rooms in a house without causing physical injury to them.

SUMMARY OF THE INVENTION

A new category for animal pest control methods is the Active Physical Method wherein the device is located in areas where animals are to be chased, and upon the animal actuating it, the animal perceives the device as suddenly and aggressively attacking the said animal. Even if said animal is caught-off guard and/or has slow reaction times, and device makes contact, the animal is not physically harmed due to the configuration of the device. No bait is used in the chasing device.

An embodiment of the method involves a spring actuated device where an animal (such as a bird) steps upon, and actuates the device, two body-members connected to spring elements initially move rapidly together at the bird. The motion of the body-members and the spring elements frighten the bird causing the bird to either depart before contact is made; or the spring elements and/or the body-members may contact the bird as it is departing. However, in the latter case the relatively slow motion of the body-members in the later phase of device actuating and the compliance of the spring element is such that the bird is not injured. The result is that such near, or real, physical contact with birds seems to significantly impress them, and they do not return to the area.

Figure 1:
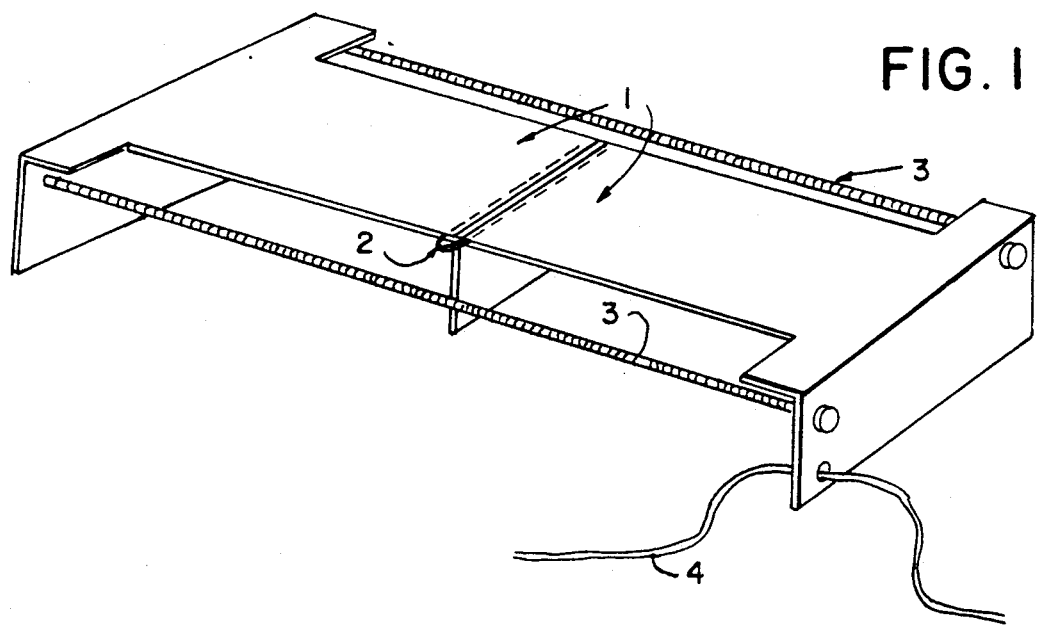
FIG. 1 is a perspective view of the spring actuated bird chasing device.

FIG. 1 depicts the spring actuated animal chasing device comprising two rigid body-members 1 held together by optional hinge element 2 and the tension force created by spring elements 3. A string line 4 is attached to the supporting structure or to other devices.

Figure 2A:
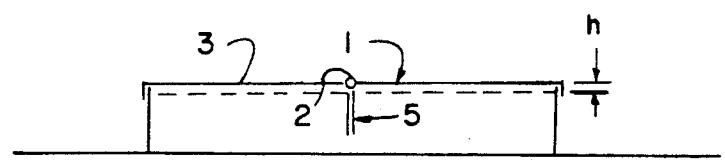
FIGS. 2a through 2e are side views of the spring actuated device which depict the sequence of action which occurs when an animal, e.g. a bird, inadvertently steps upon the device.
Figure 2B:
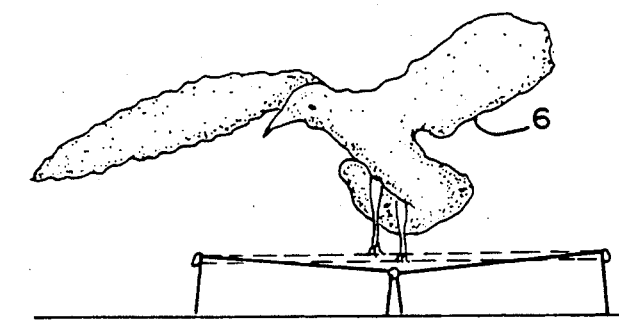
Figure 2C:
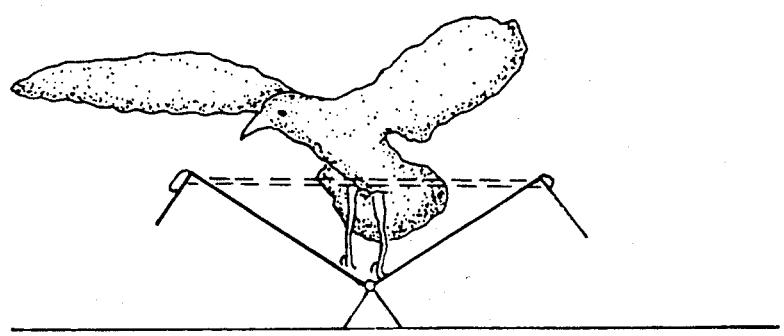
Figure 2D:
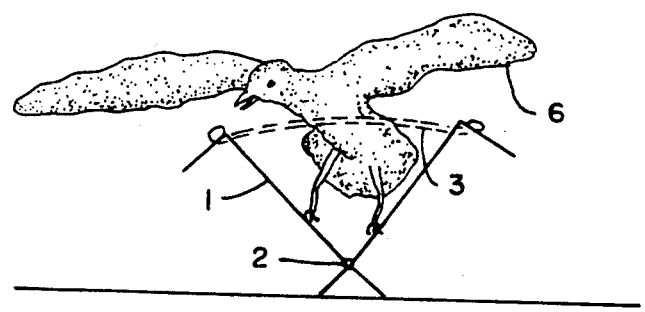
Figure 2E:
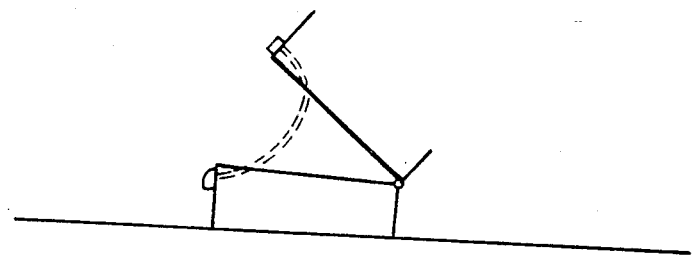

FIG. 2a shows the spring actuated device in a loaded condition wherein an equilibrium condition exists by virtue of the forces from the spring elements 3 pressing together the two flat end surfaces 5 of the rigid body-members 1. The distance "h" between the top surfaces of the body members and the spring elements 3 in FIG. 2a determines the actuation sensitivity of the device to forces applied perpendicular to the top surfaces of the body-members 1. The sensitivity can be adjusted by providing several attachment points in the body-member 1 which retain the end of one of the springs 3 such that when distance "h" is large—the unit is relatively insensitive., and when "h" is small, the unit can be made very sensitive. In FIG. 2b a small force from an animal, e.g. a bird 6, depresses the center section of the device sufficiently to create a moment (torque) caused by the spring elements 3 when the hinge 2 moves below the spring elements 3 to pull the two ends of the body-members 1 together rapidly. FIG. 2c depicts the situation where the movement is approximately half-completed. In FIG. 2c, it is to be observed that the spring elements 3 are closest to the bird 6. FIG. 2d shows the condition where the potential energy in springs 3 is expended and the springs are now retarding the closure motion of the body-members 21. FIG. 2e depicts the device in an equilibrium condition after actuation has been consummated.

Figure 3:
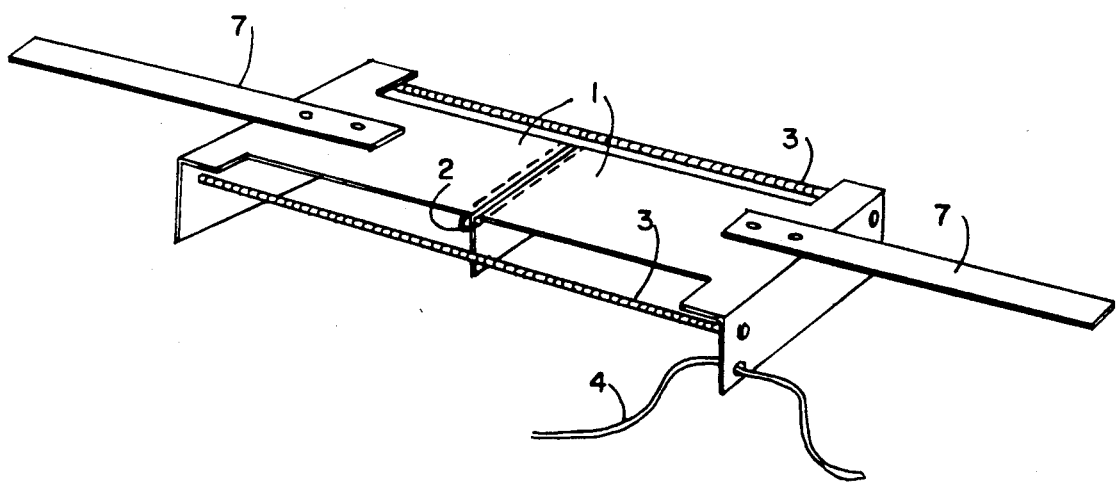
FIG. 3 is a perspective view of the spring actuated bird chasing device with extension elements.

FIG. 3 is a modification of the basic spring actuated device with extension elements 7 attached to the body members 1 in order to additionally disturb larger animals, e.g. pelicans.

For exterior use, the body-members 1 are made of stainless steel or other non-corrosive materials e.g.. aluminum, plastic, or wood. The body-members 1 should be perforated, particularly in the area near the hinge 2 in order to make the device less sensitive to false actuations by the wind or rain. The hinge element 2 may be a standard metal hinge or a loop of elastic cord, e.g. bungee cord. The spring element 3 may be a standard metal coil spring or an elastic cord.

Common usage would make a multiplicity of spring actuated bird chasing devices attached together at regular intervals (e.g. three feet) to the string line 4 which is in turn attached to the boat deck, railing, parapet, building ledge, etc., so that the devices can not be moved from the surfaces by bird actuation or the wind.

If the spring actuated device is to be used on a non rigid surface e.g. sail covers or bimini tops, then a base plate supports the device having a common hinge, lashing, or another type of flexible coupling, located at the bottom of one extremity of the body members 1.

An obvious extension of the spring actuated animal chasing device is to automate the resetting of the device, e.g. by hinging one extreme bottom end of a body-member 1 to a base plate which contains an electric motor driving a drum through a one-way clutch, a cord attached to the drum and passing over a pulley to the other extreme end of the other body-member 21. After actuation of the device, a sensing switch turns on the motor which slowly winds the cord around the drum pulling the device into an equilibrium condition with spring elements 3 extended. A power supply unit comprising a solar cell and batteries could provide electric power for perhaps six devices serviced by an electric cable which would also perform the other functions of string line 4.

Another obvious extension of the spring actuated device is to add soft, compliant material, e.g. carpeting or sponge neoprene on the upper surfaces of the body-member 1 in order to further lessen the impact on the animals.

I claim:

1. An animal chasing device which utilizes two body-members having a size and shape held together by a tension force created by springs pressing together two flat end surfaces of the body-members in an equilibrium condition until a force from an animal depresses the two flat end surfaces to an extent that a torque is created which causes extreme ends of the body-members and the springs to move rapidly at the animal, thus scaring the animal whether post-actuation contact is made, or not made, with the animal.

2. The device of claim 1 which when actuated by an animal utilizes elastic cord, (a) to close the body-members initially very rapidly towards the animal; (b) to initially contact the animal (if contact is made) with its compliant qualities rather than to make contact with rigid members; (c) to tend to eject a foot or body of the animal from the device., and (d) to first resist and then stop the movement of the two body-members in order to soften any impact with the animal.

3. The device of claim 1 including the ability of change the movement of the two body members of the device to be most effective against different species of animals by modifying the size and shape of the body members, adding an extension to the body-members, as well as by changing the strength of the spring.

4. The device of claim 1 wherein actuation sensitivity can be adjusted by moving an end of one of the springs into different attachment points in the body-member.

5. A bird scaring device comprising two rigid flat T-shaped body members having longer outer downward extensions at larger outer ends of the body members and having shorter inner downward members, first and second burning-cord tension springs attached to opposite outer downward extensions in parallel relationship of the springs, the springs extending outside of the shorter inner downward extensions, the springs holding the shorter extensions abutted in parallel relationship with the longer outer extensions resting on a surface and supporting the body members above the surface and holding the shorter inner downward extensions above the surface on which the outer extensions rest, for collapsing the inner ends of the body members downward below the springs when a bird steps on the body members, for pulling the outer ends of the body members inward toward the bird, for scaring the bird and training the bird to avoid approaching things protected by the bird scaring device.

6. A bird scaring device comprising two rigid body members having long downward extensions at outer ends of the body members and having short inner downward extensions which are abutted at inner ends of the body members, a tension spring attached to opposite long downward extensions, the spring holding the short extensions abutted in parallel relationship, with the long extensions resting on a surface for supporting the body members above the surface and holding the short downward extensions above the surface on which the long extensions rest, for collapsing the inner ends of the body members downward below the spring when a bird steps on the body members, for pulling the outer ends of the body members inward toward the bird, for scaring the bird and training the bird to avoid approaching surfaces protected by the bird scaring device.

* * * * *

UNITED STATES PATENT AND TRADEMARK OFFICE
CERTIFICATE OF CORRECTION

PATENT NO. : 5,216,832

DATED : June 8, 1993

INVENTOR(S) : Ronald A. Darby

It is certified that error appears in the above-identified patent and that said Letters Patent is hereby corrected as shown below:

Column 4, line 30, "burning-cord" should be --bungee-cord--.

Signed and Sealed this

Eighth Day of February, 1994

Attest:

BRUCE LEHMAN

*Attesting Officer*         *Commissioner of Patents and Trademarks*

UNITED STATES PATENT AND TRADEMARK OFFICE
CERTIFICATE OF CORRECTION

PATENT NO. : 5,216,832
DATED : June 8, 1993
INVENTOR(S) : Ronald A. Darby

It is certified that error appears in the above-indentified patent and that said Letters Patent is hereby corrected as shown below:

On the cover page, item 76, "North" should be inserted before "Kalaheo".

In the Abstract:

Line 10, cancel "and air".

Column 1, line 63 to column 2, line 8, "According to" begins a new paragraph which should be extended to the margin.

Column 2, after line 42, insert the subtitle "Brief Description of the Drawings".

Column 2, after line 50, insert the subtitle "Description of the Preferred Embodiments".

Column 3, line 45, "21" should be "1".

Signed and Sealed this

Fifth Day of July, 1994

Attest:

BRUCE LEHMAN

Attesting Officer

Commissioner of Patents and Trademarks